United States Patent Office 3,415,835
Patented Dec. 10, 1968

3,415,835
2-LOWER-ALKANOYL-AMIDO-NICOTINIC ACID AND DERIVATIVES THEREOF
Arthur Stempel, Teaneck, and Leo Henryk Sternbach, Upper Montclair, N.J., assignors to Hoffmann-La Roche Inc., Nutley, N.J., a corporation of New Jersey
No Drawing. Filed June 21, 1966, Ser. No. 559,110
4 Claims. (Cl. 260—295.5)

ABSTRACT OF THE DISCLOSURE

Novel acetamidonicotinic acid derivatives are prepared by treating aminopyridinecarboxylic acid with an acid anhydride. The products are chemotherapeutically useful against Encephalo myocarditis virus and Herpes virus.

---

This invention is concerned with certain pyridine derivatives which are characterized by antiviral activity and are represented by the formula:

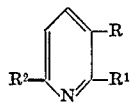

(I)

wherein R, $R^1$, and $R^2$, when taken individually, are different and R is a member selected from the group consisting of carboxyl and lower alkanoylamido; $R^1$ is a member selected from the group consisting of hydrogen, carboxyl, and lower alkanoylamido; and $R^2$ is a member selected from the group consisting of hydrogen and lower alkanoylamido; and R and $R^1$, when taken together, form the

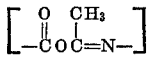

radical and $R^2$ is hydrogen.

In a more particular aspect, this invention is concerned with novel antibacterial pyridine derivatives of the formula:

(II)

wherein $R^a$, when taken alone, is carboxyl; $R^b$, when taken alone, is lower alkanoylamido; and $R^a$ and $R^b$, when taken together, form the

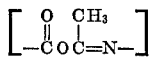

radical.

An especially preferred class, because of the generally superior antiviral activity of the members thereof, is that represented by the formula:

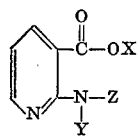

(III)

wherein X, when taken alone, is hydrogen; Y, when taken alone, is hydrogen; Z, when taken alone, is lower alkanoyl; and X, Y, and Z, when taken together, are ethylidyne.

By the terms "lower alkanoylamido" and "lower alkanoyl," as employed herein, are meant radicals of the formulae:

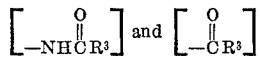

wherein $R^3$ is lower alkyl.

By the term "lower alkyl" is meant a straight or branched chain alkyl radical of up to about 6 carbons, such as methyl, ethyl, propyl, isopropyl, butyl, sec.-butyl, tert.-butyl, and the like. Preferred lower alkyl radicals are those having up to about 3 carbon atoms, with methyl being especially preferred.

The antiviral pyridine derivatives disclosed herein are readily synthesized from the corresponding aminopyridine carboxylic acid by reaction with an acid anhydride. This reaction is generally effected at elevated temperatures, preferably in the range of from 100–150° C. Although unnecessary, the reaction may be carried out in solvents or other inert reaction media, such as organic hydrocarbons including benzene, toluene, and the like, or chlorinated hydrocarbons such as chlorobenzene, and the like.

Normally, the product of this reaction is an alkanoylamidopyridine carboxylic acid. However, when acetic anhydride is employed as the acylating agent, and aminopyridine carboxylic acid is either 2-aminonicotinic acid or 3-aminopicolinic acid, a bicyclic methylpyridooxazinone results. This bicyclic compound is readily hydrolyzed, as by treatment with water, to yield the corresponding acetamidopyridine carboxylic acid.

As an alternative procedure, the alkanoylamidopyridine carboxylic acids may be produced by reaction of an acid anhydride with an aminopicoline to form an acetamidopyridine carboxylic acid.

As stated above, the pyridine derivatives disclosed herein are useful as antiviral agents, being particularly active against the encephalo myocarditis virus (Col-SK) and the herpes virus. These compounds may be administered internally, either enterally or parenterally, in the form of pharmaceutical preparations containing the pyridine derivative in admixture with a pharmaceutically acceptable organic or inorganic carrier material, such as water, gelatin, lactose, starch, magnesium stearate, talc, vegetable oils, gums, polyethylene glycol, petroleum jelly, and the like. These pharmaceutical preparations may be in solid form, such as tablets, capsules, lozenges, dragees, or the like; or in liquid form, such as emulsions, syrups, solutions, and so forth. The amount of pyridine derivative in these formulations is not narrowly critical and can vary from 1–99 percent as may be desired. When employed in an oral dosage form, it is preferred that the pyridine compound of this invention comprises from about 1 to about 40 weight percent of the composition, with amounts of about 15 to about 30 weight percent being preferred.

The following examples are illustrative. In these examples, the pyridine derivatives of this invention were tested for activity against Col-SK and herpes viruses by the following technique: A group of Swiss albino mice weighing 9 to 12 grams each was treated intraperitoneally with the compound being tested. Twenty-four hours after this treatment, the treated mice and an untreated control group of mice were treated intraperitoneally with a brain pool of Col-SK or herpes virus. The treated group of mice was given a second treatment immediately after infection and again 24 hours after the infection. The treated and untreated mice were then observed daily for symptoms and the number of survivors recorded after 21 days. The results of thees tests are reported in the examples in the form of $CD_{50}$ values, as determined by the method of Reed and Muench [Am. Jour. Hygiene 27, 493 (1961)] or, in the case of less active compounds in the form of percent survival rate, the difference between the percent survivors of the treated group less the percent survivors of the untreated control group.

Example 1

A mixture of 9.3 grams of 2-aminonicotinic acid in 50 milliliters of acetic anhydride was heated at reflux with stirring for one hour. The resulting solution was concentrated to dryness under reduced pressure and the residue was crystallized from benzene to give 6.2 grams of 2-methyl-4H-pyrido[2,3-d][1,3]-oxazin-4-one melting at 173–177.5° C. On recrystallization from benzene, this product melted at 175–178° C.

*Analysis.*—Calculated for $C_8H_6N_2O_2$: C, 59.26; H, 3.73; N, 17.28. Found: C, 59.69; H, 3.77; N, 16.96.

A mixture of 9.9 grams of 2-methyl-4H-pyrido[2,3-d][1,3]-oxazin-4-one in 100 milliliters of water was stirred for one hour on a steam bath. The resulting clear solution was chilled in an ice bath, thus forming crystals of 2-acetamidonicotinic acid, which on filtration weighed 5.2 grams. This product melted at 189–192° C., then resolidified and melted at 235–240° C. On recrystallization from aqueous acetonitrile, this product melted at 193–195° C., then resolidified and melted at 239–242° C.

*Analysis.*—Calculated for $C_8H_8N_2O_3$: C, 53.33; H, 4.48; N, 15.55. Found: C, 53.19; H, 4.67; N, 15.65.

Thi bicyclic 2-methyl-4H-pyrido[2,3-d][1,3]oxazin-4-one, when tested against Col-SK and herpes virus at a dosage of 200 milligrams per kilogram, provided 30 and 32 percent survival rates, respectively. The 2-acetamidonicotinic acid was very active, having a $CD_{50}$ of 59.5 against the Col-SK virus and 55.5 against the herpes virus. This latter compound was also active against influenza type A and ECHO 9 viruses.

Example 2

A mixture of 20 grams of 3-aminopicolinic acid in 20 milliliters of acetic anhydride was refluxed for one hour. After concentration to dryness under reduced pressure, the residue was recrystallized from a mixture of benzene and hexane to yield 12.6 grams of 2-methyl-4H-pyrido-[3,2-b][1,3]oxazin-4-one melting at 111-115° C. After decolorization with activated charcoal, followed by recrystallization from a mixture of benzene and hexane, the product melted at 114–116° C.

*Analysis.*—Calculated for $C_8H_6N_2O_2$: C, 59.26; H, 3,73; N, 17.28. Found: C, 59.71; H, 3.97; N, 16.97.

A mixture of 6.8 grams of 2-methyl-4H-pyrido[3,2-d][1,3]-oxazin-4-one in 100 milliliters of water was stirred while heating on a steam bath for ¾ hour. On cooling, crystallization took place and there was recovered 6.4 grams of 3-acetamidopicolinic acid, melting at 225–227° C. After recrystallization from water, the product melted at 216–218° C.

*Analysis.*—Calculated for $C_8H_8N_2O_3$: C, 53.33; H, 4.48; N, 15.55. Found: C, 53.04; H, 4.20; N, 15.59.

The 3-acetamidopicolinic acid, when tested against Col-SK and herpes viruses at a dosage of 40–50 milligrams per kilogram, provided percent survival rates of 23 and 17, respectively.

Example 3

A mixture of 25 grams of 2-aminonicotinic acid in 150 milliliters of propionic anhydride was heated at 140° C. for one hour and then concentrated to dryness under reduced pressure. The residue was dissolved in 250 milliliters of acetone, decolorized with charcoal and concentrated to about 100 milliliters. On cooling, there was obtained 2-propionamidonicotinic acid, which after filtration melted at 173–174° C. On recrystallization from methyl ethyl ketone, there was obtained colorless needles melting at 174–175° C.

*Analysis.*—Calculated for $C_9H_{10}N_2O_3$: C, 55.56; H, 5.19; N, 14.43. Found: 55.88; H, 5.43; N, 14.34.

The $CD_{50}$ values for this product against Col-SK and herpes viruses were 85.4 and 102, respectively.

Example 4

Employing apparatus and procedures similar to those described in Example 3, but substituting butyric anhydride for propionic anhydride, there was obtained 2-butyramidonicotinic acid melting at 170–173° C., and after recrystallization melting at 172–173° C.

*Analysis.*—Calculated for $C_{10}H_{12}N_2O_3$: C, 57.68; H, 5.81. Found: C, 57.64; H, 6.09.

The $CD_{50}$ values of 2-butyramidonicotinic acid against Col-SK and herpes viruses were 173 and 250, respectively.

Example 5

Employing apparatus and procedures similar to those described in Example 3, except that isobutyric anhydride was substituted for propionic anhydride, there was obtained 2-isobutyramidonicotinic acid melting at 125–135° C., and on recrystallization melting at 147–148° C.

*Analysis.*—Calculated for $C_{10}H_{12}N_2O_3$: C, 57.68; H, 5.81; N, 13.66. Found: C, 57.68; H, 5.60; N, 13.58.

The $CD_{50}$ values of this product against Col-SK and herpes viruses were 187 and 250, respectively.

Example 6

6-amino-3-picoline was reacted with acetic anhydride to produce 6-acetamido-3-picoline melting at 100–101° C. This compound, on treatment with potassium permanganate, was oxidized to 6-acetamidonicotinic acid melting at 274–275° C. This product had a $CD_{50}$ value against the Col-SK virus of 133. In addition, the 6-acetamidonicotinic acid provided a 25 percent survival rate against the herpes virus.

Ethyl 2-acetamidonicotinate and 2-acetamido-3-pyridine carboxylic acid were both inactive when tested against Col-SK and herpes viruses.

Example 7

Illustrative formulations are prepared as follows:

(a) *Capsule.*—50 parts by weight of 2-methyl-4H-pyrid[2,3-d][1,3]oxazin-4-one are mixed with 125 parts by weight of lactose and 30 parts by weight of cornstarch. The resulting mixture is blended by passing through a Fitzpatrick Comminuting Machine with a No. 1A screen with knives forward. The blend is then mixed with 5 parts by weight of talc and blended. The resulting mixture is charged into No. 4 hard shell gelatin capsules, each capsule containing 210 milligrams of the composition.

(b) *Tablet.*—25 parts by weight of 2-methyl-4H-pyrid-[2,3-d][1,3]oxazin-4-one are mixed with 64.5 parts by weight of lactose, 10 parts by weight of cornstarch, and 0.5 part by weight of magnesium stearate. After blending, the mixture is slugged on a tablet compressing machine, the slugs are comminuted to No. 16 mesh and the comminuted particles are mixed. The tablets are then compressed at a tablet weight of 100 milligrams using tablet punches of approximately ¼″ diameter.

(c) *Suppository.*—1.23 parts by weight of Wecobee M (a refined pharmaceutical grade of synthetic cocoa butter—coconut derived—marketed by E. F. Drew Company, New York, New York) and 0.045 part by weight of carnauba wax are melted, mixed, and cooled to 45° C. 2-methyl-4H-pyrid[2,3-d][1,3]oxazin-4-one is stirred in as a fine powder until uniformly and completely dispersed. The resulting mixture is poured into suppository molds to yield suppositories having an individual weight of 1.3 grams. The suppositories are cooled and removed from the molds.

Similarly, formulations may be produced containing the other products of Examples 1–6 by substituting such compounds for the 2-methyl-4H-pyrid[2,3-d][1,3]oxazin-4-one.

We claim:
1. A compound as defined by the formula:
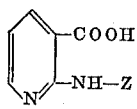
wherein Z is lower alkanoyl.
2. 2-propionamidonicotinic acid.
3. 2-butyramidonicotinic acid.
4. 2-isobutyramidonicotinic acid.
References Cited
Takanobu et al.: J. Pharm. Soc., Japan, vol. 75, pp. 292–6, (1955).
Chemical Abstracts, vol. 50, Par. 1808–1809, (1956).
HENRY R. JILES, *Primary Examiner.*
A. L. ROTMAN, *Assistant Examiner.*
U.S. Cl. X.R.
260—244; 167—65